(12) United States Patent
Shin et al.

(10) Patent No.: US 11,428,990 B2
(45) Date of Patent: Aug. 30, 2022

(54) LIQUID CRYSTAL DISPLAY DEVICE AND MANUFACTURING METHOD THEREOF

(71) Applicant: LG CHEM, LTD., Seoul (KR)

(72) Inventors: Nayoung Shin, Daejeon (KR); Junwon Chang, Daejeon (KR); Moon Soo Park, Daejeon (KR); Kyun Il Rah, Daejeon (KR); Sun Kug Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/633,747

(22) PCT Filed: Dec. 26, 2018

(86) PCT No.: PCT/KR2018/016628
§ 371 (c)(1),
(2) Date: Jan. 24, 2020

(87) PCT Pub. No.: WO2019/135535
PCT Pub. Date: Jul. 11, 2019

(65) Prior Publication Data
US 2021/0088854 A1   Mar. 25, 2021

(30) Foreign Application Priority Data
Jan. 4, 2018  (KR) .................. 10-2018-0001110

(51) Int. Cl.
G02F 1/13363 (2006.01)
G02F 1/1335 (2006.01)
G02F 1/1343 (2006.01)

(52) U.S. Cl.
CPC .. *G02F 1/133634* (2013.01); *G02F 1/133528* (2013.01); *G02F 1/13363* (2013.01); *G02F 1/133531* (2021.01); *G02F 1/133638* (2021.01); *G02F 1/134363* (2013.01); *G02F 2413/04* (2013.01); *G02F 2413/07* (2013.01); *G02F 2413/08* (2013.01)

(58) Field of Classification Search
CPC ................................................ G02F 1/133638
See application file for complete search history.

(56) References Cited

U.S. PATENT DOCUMENTS

| 6,089,718 | A | 7/2000 | Hashizume |
| 2003/0016325 | A1 | 1/2003 | Konno et al. |
| 2004/0252258 | A1 | 12/2004 | Matsushima |

(Continued)

FOREIGN PATENT DOCUMENTS

| JP | 2005-043913 A | 2/2005 |
| JP | 2006-276871 A | 10/2006 |

(Continued)

*Primary Examiner* — Alexander P Gross
(74) *Attorney, Agent, or Firm* — Dentons US LLP

(57) ABSTRACT

The present application relates to a liquid crystal display comprising: an upper polarizer; a lower polarizer; and a liquid crystal panel provided between the upper polarizer and the lower polarizer, in which the upper polarizer and the lower polarizer are provided such that the absorption axes thereof are parallel to each other, a wavelength plate is comprised between the upper polarizer and the liquid crystal panel which rotates linear polarized light at 85 to 90 degrees, and the liquid crystal panel is a horizontally aligned liquid crystal mode.

3 Claims, 9 Drawing Sheets

(56) References Cited

U.S. PATENT DOCUMENTS

| | | | |
|---|---|---|---|
| 2008/0024700 A1* | 1/2008 | Yoshimi | G02F 1/13363 |
| | | | 349/96 |
| 2009/0174843 A1 | 7/2009 | Sakai et al. | |
| 2014/0293194 A1 | 10/2014 | Kang et al. | |
| 2015/0015830 A1* | 1/2015 | Kim | G02F 1/13363 |
| | | | 349/96 |
| 2017/0276960 A1* | 9/2017 | Osterman | G02F 1/13439 |

FOREIGN PATENT DOCUMENTS

| | | | |
|---|---|---|---|
| JP | 2008-26797 A | | 2/2008 |
| JP | 2015-226110 A | | 12/2015 |
| KR | 10-2003-0011572 A | | 2/2003 |
| KR | 20070082768 A | * | 8/2007 |
| KR | 10-2008-0010273 A | | 1/2008 |
| KR | 10-2015-0007518 A | | 1/2015 |
| KR | 10-2015-0015315 A | | 2/2015 |
| KR | 10-2015-0130549 A | | 11/2015 |
| KR | 10-2016-0112380 A | | 9/2016 |
| WO | 2008/018212 A1 | | 2/2008 |

* cited by examiner

[Figure 1]
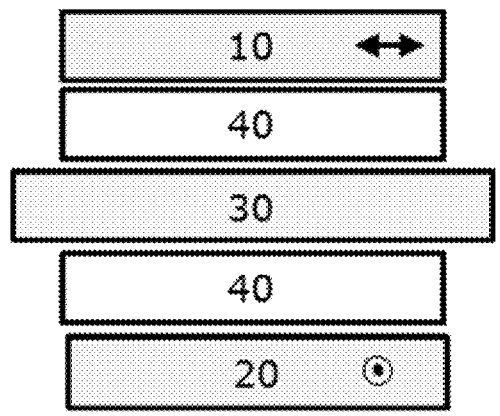
[Figure 2]
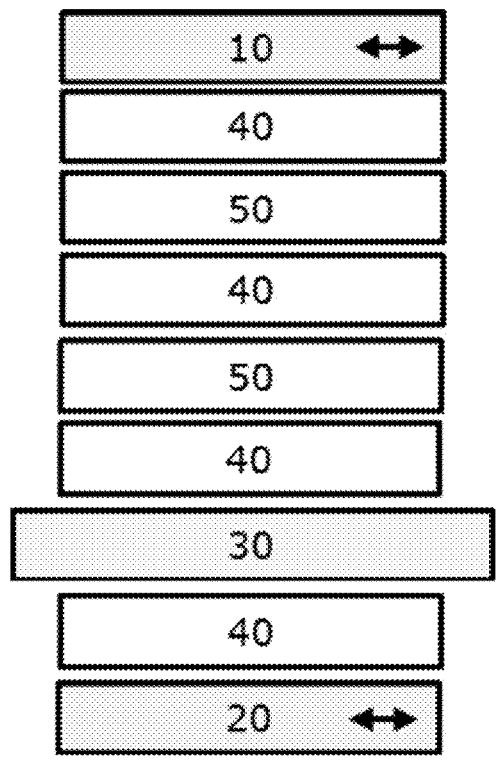

[Figure 3]
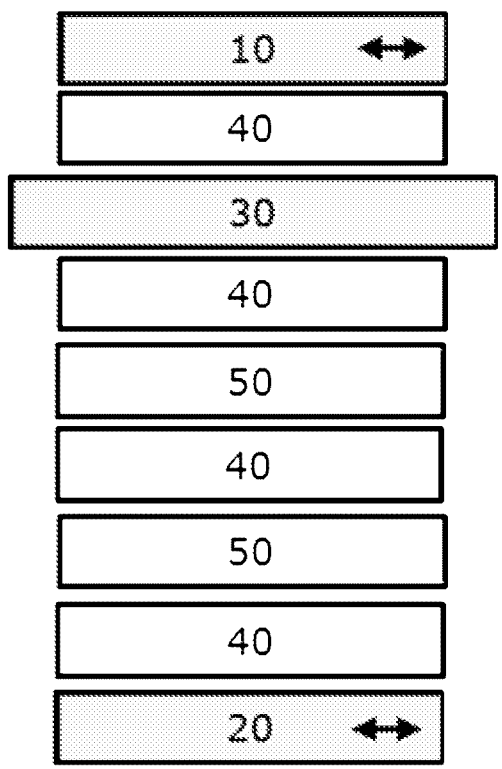

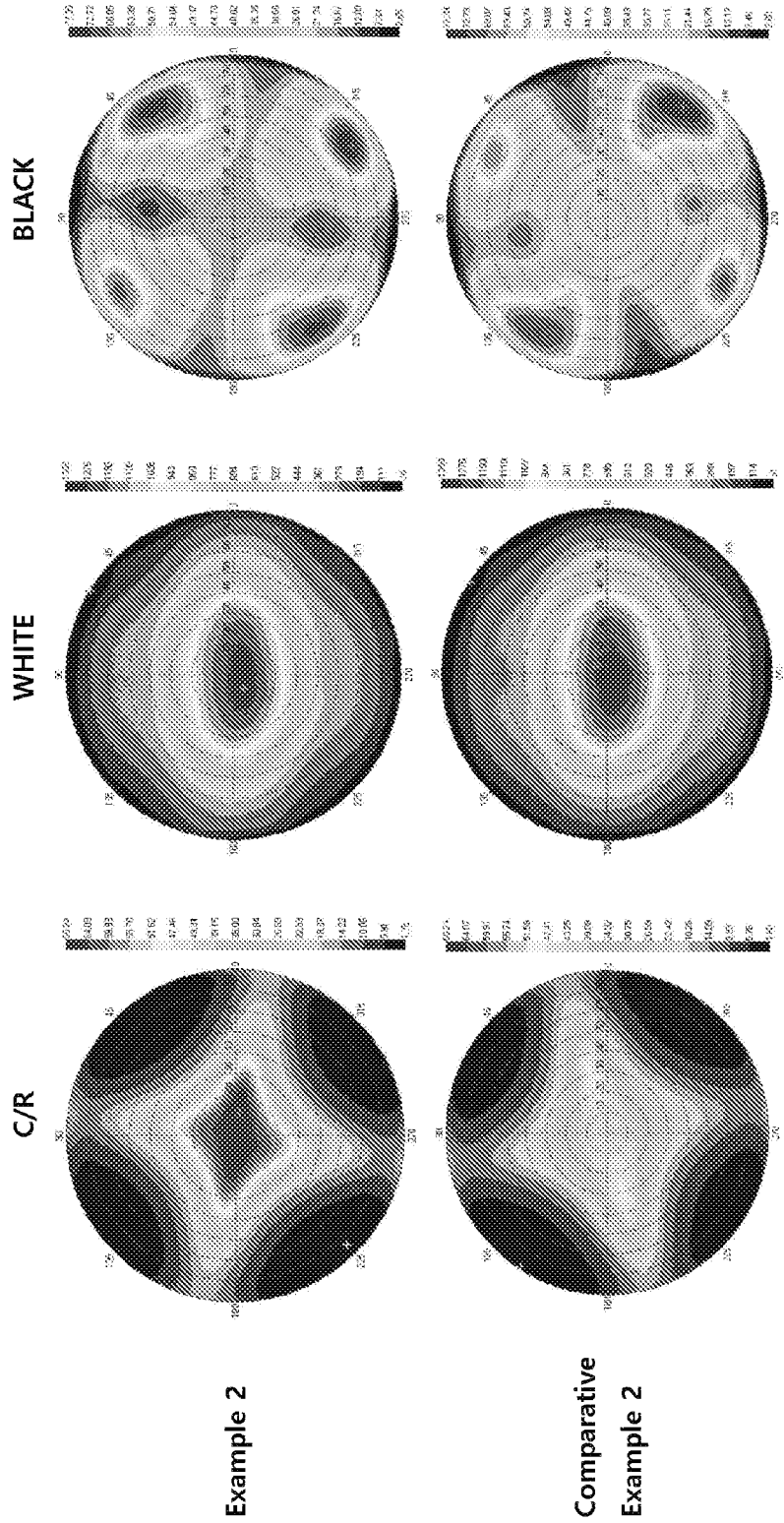
[Figure 4]

[Figure 5]
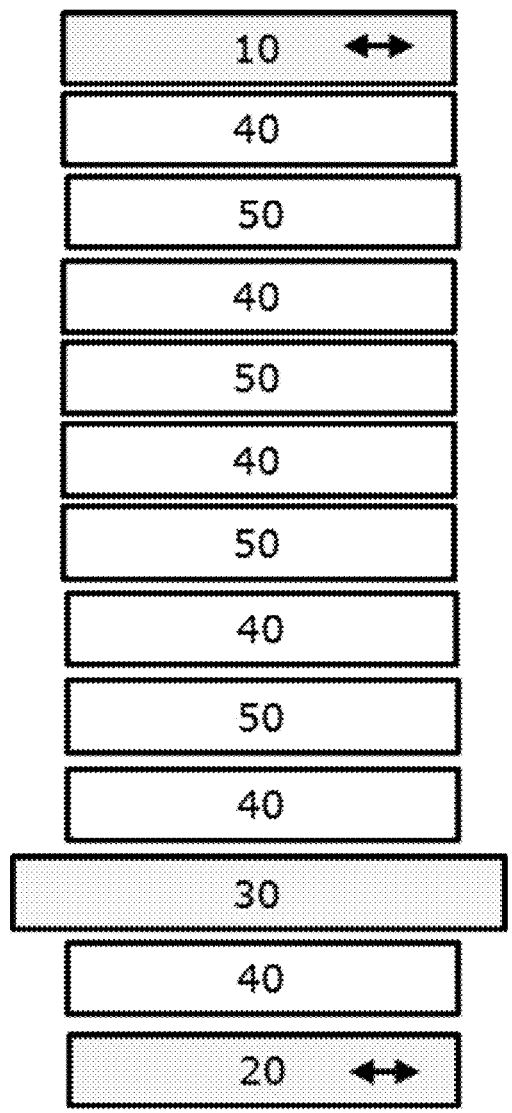

[Figure 6]
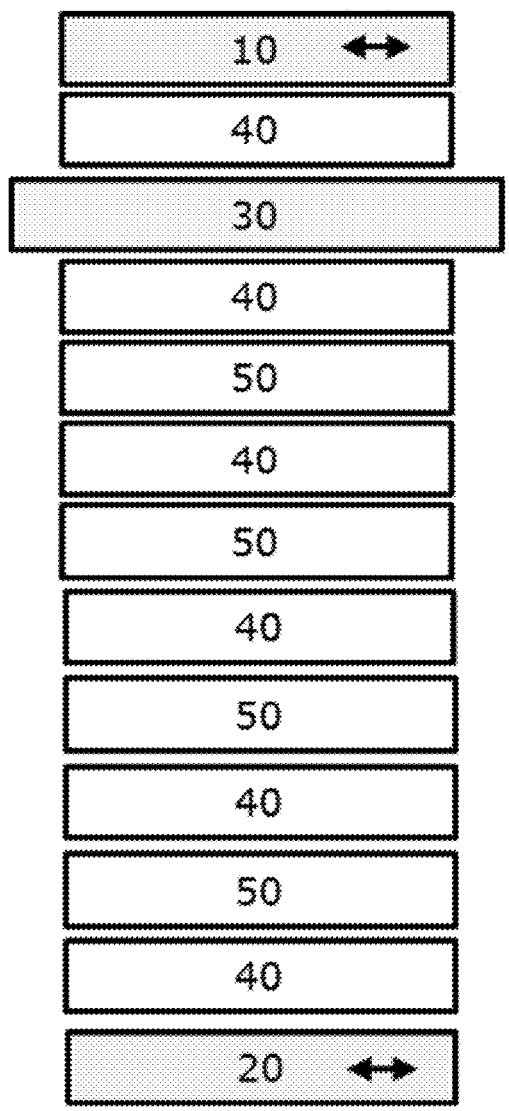

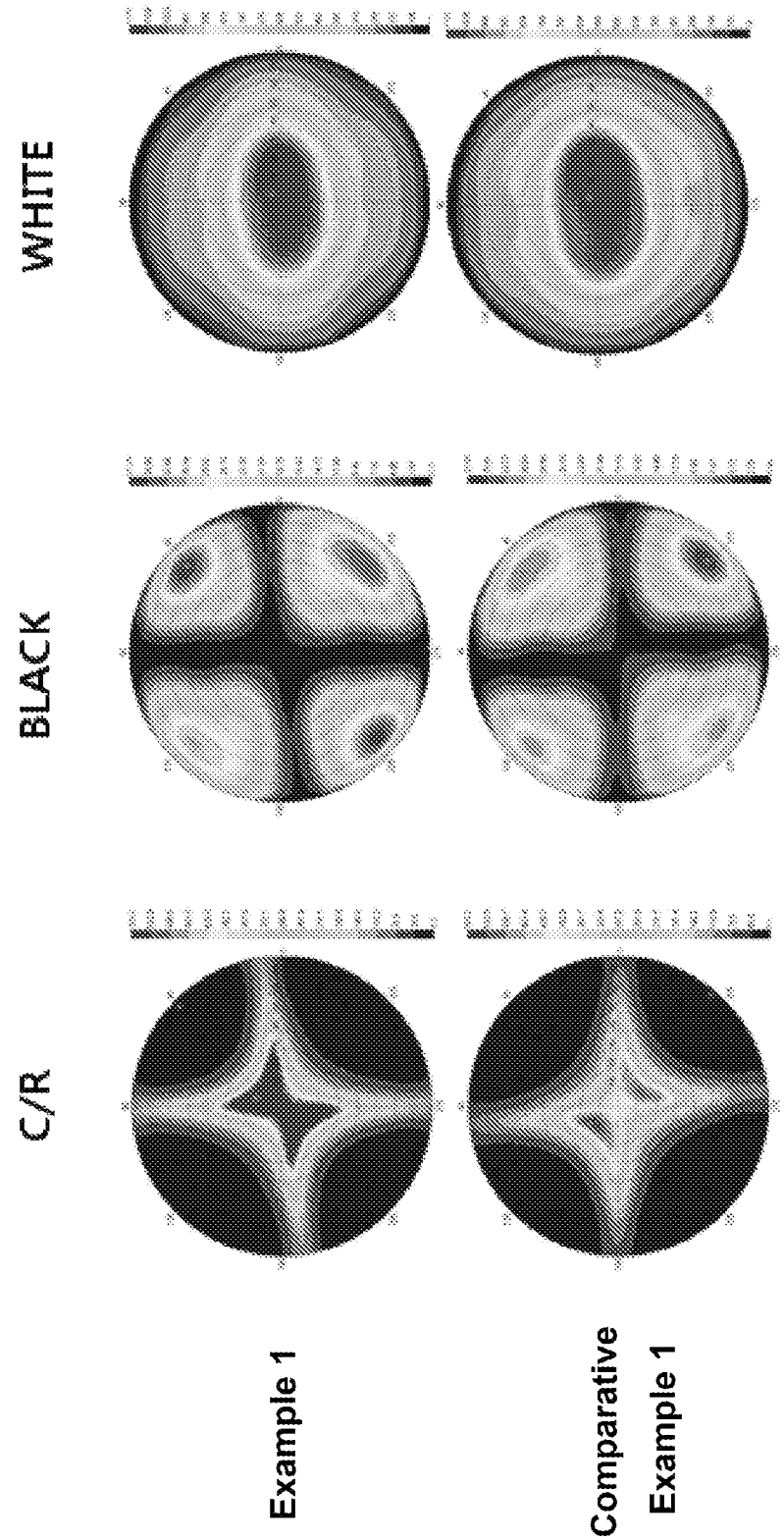
[Figure 7]

[Figure 8]
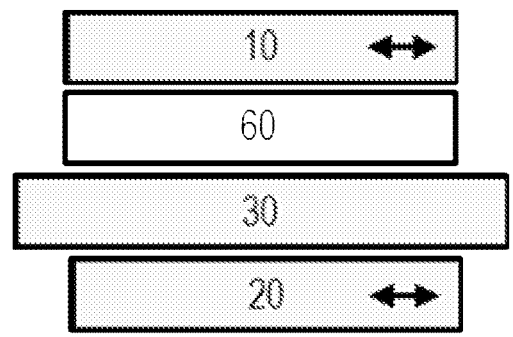

[Figure 9]
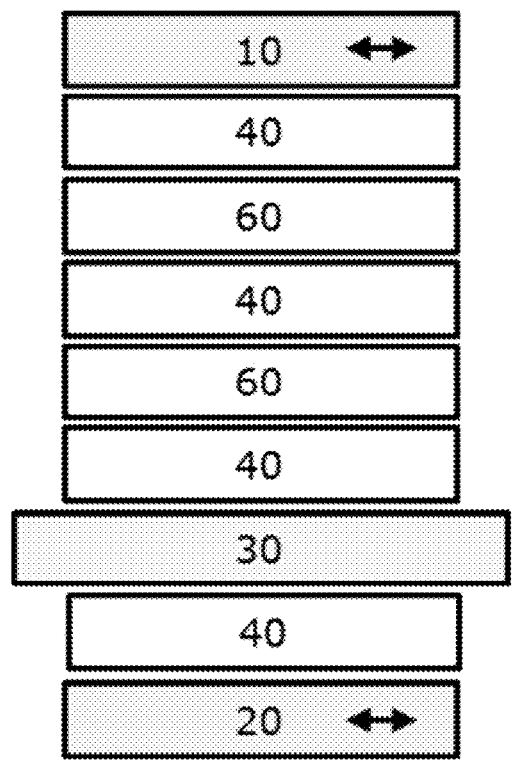
[Figure 10]
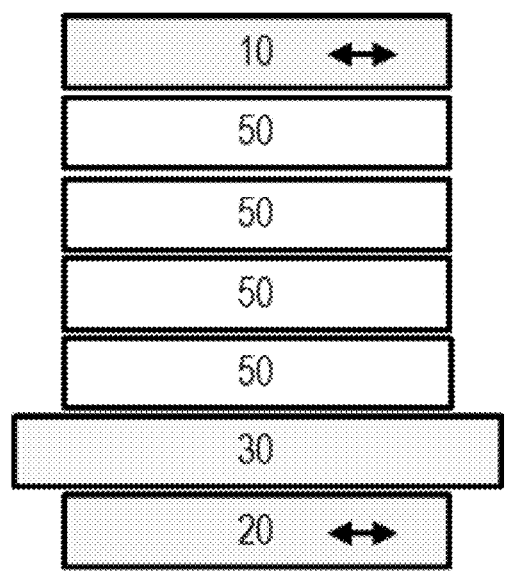

[Figure 11]
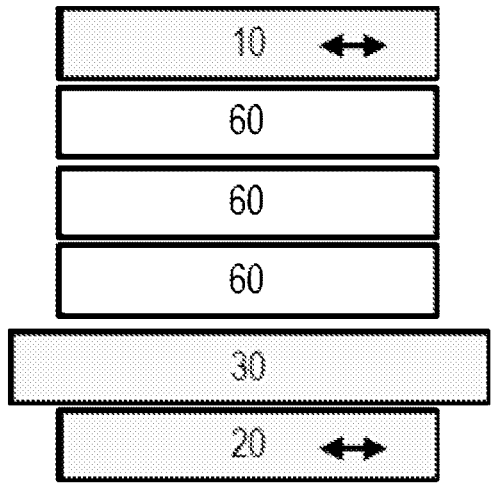
[Figure 12]
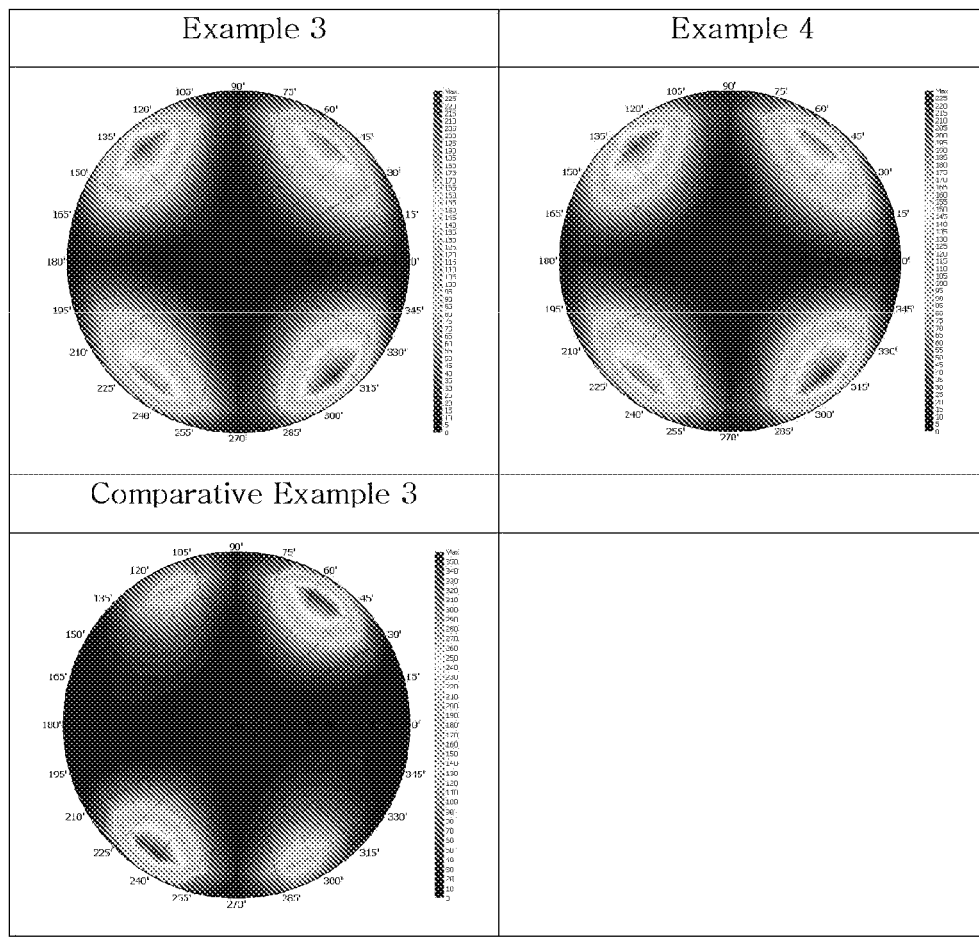

LIQUID CRYSTAL DISPLAY DEVICE AND MANUFACTURING METHOD THEREOF

The present application is a National Phase entry pursuant to 35 U.S.C. § 371 of International Application No. PCT/KR2018/016628 filed on Dec. 26, 2018, and claims priority to and the benefit of Korean Patent Application No. 10-2018-0001110 filed in the Korean Intellectual Property Office on Jan. 4, 2018, the entire contents of which are incorporated herein by reference.

FIELD

The present application relates to a liquid crystal display and a method for manufacturing the same.

BACKGROUND

In recent years, as there has been a growing interest in information display and a demand for a portable information medium has increased, research and commercialization of a lightweight thin film flat panel display (FPD), which replaces a cathode ray tube (CRT) which is the existing display device, have been mainly carried out. In particular, among such flat panel display devices, a liquid crystal display (LCD) as a device for displaying an image using optical anisotropy of a liquid crystal is excellent in resolution, color display, and image quality and is actively applied to a notebook or a desktop monitor.

In such a liquid crystal display, liquid crystal molecules of a liquid crystal layer are driven by a difference in voltage applied to a common electrode and a pixel electrode.

Liquid crystals have features such as dielectric anisotropy and refractive anisotropy. The dielectric anisotropy means that the degree of polarization induced by an electric field varies depending on long axis and short axis directions of the liquid crystal. Refractive anisotropy means that a refractive index varies depending on the long axis and short axis directions of the liquid crystal, which causes a polarization state to be changed because the refractive index felt varies according to a direction when light passes through the liquid crystal molecules.

As a result, the liquid crystal display has a liquid crystal panel constituted by a pair of transparent insulating substrates formed by planes facing each other with the liquid crystal layer interposed therebetween as a required component, and arbitrarily controls the polarization of the liquid crystal molecules through a change in electric field between respective electric field generating electrodes, and displays various images by using transmittance of light which is changed at this time.

In this case, a polarizer is located at each of upper and lower portions of the liquid crystal panel and the polarizer transmits a polarization component of the light, which is coincides with a transmission axis, and determines a transmission degree of light by arrangement of transmission axes of two polarizers and arrangement characteristics of the liquid crystals.

The polarizer used in the liquid crystal display in the related art is mainly a PVA elongated type in which iodine ions are aligned through stretching by using polyvinyl alcohol (PVA) having good adsorption ability with iodine.

The present application has been made in an effort to provide a liquid crystal display capable of resolving a size limitation of a polarizer and having an enhanced front CR characteristic.

SUMMARY

An embodiment of the present application provides a liquid crystal display comprising: an upper polarizer; a lower polarizer; and a liquid crystal panel provided between the upper polarizer and the lower polarizer, wherein the upper polarizer and the lower polarizer are provided such that the absorption axes thereof are parallel to each other, a wavelength plate is provided between the upper polarizer and the liquid crystal panel that rotates linear polarized light at 85 to 95 degrees, and the liquid crystal panel is a horizontally aligned mode liquid crystal panel.

According to an embodiment of the present application, absorption axes of an upper polarizer and a lower polarizer of a liquid crystal display are provided to be parallel to each other, thereby resolving a size limitation of a polarizer according to a width of a polarizer raw material.

Further, according to an embodiment of the present application, a wave plate is provided between the upper polarizer and a liquid crystal panel that rotates linear polarization at 85 to 95 degrees, and as a result, a front contrast ratio (CR) can be increased by reducing black luminance due to scattering of side light, as compared with a case where the wave plate is provided between the lower polarizer and the liquid crystal panel.

BRIEF DESCRIPTION OF THE DRAWINGS

FIG. 1 is a diagram schematically illustrating a structure of a liquid crystal display in the related art.

FIGS. 2 and 3 are diagrams schematically illustrating a structure of a liquid crystal display of Example 2 and Comparative Example 2 according to an embodiment of the present application.

FIGS. 4A and 4B are diagrams illustrating a front optical characteristic of a liquid crystal display of Example 2 according to an embodiment of the present application and Comparative Example 2, respectively.

FIG. 5 is a diagram schematically illustrating a structure of a liquid crystal display of Example 1 according to an embodiment of the present application.

FIG. 6 is a diagram schematically illustrating a structure of a liquid crystal display of Comparative Example 1 according to an embodiment of the present application.

FIGS. 7A and 7B are diagrams illustrating a front optical characteristic of a liquid crystal display of Example 1 according to an embodiment of the present application and Comparative Example 1, respectively.

FIGS. 8 and 9 are diagrams schematically illustrating a structure of a liquid crystal display according to an embodiment of the present application.

FIG. 10 is a diagram schematically illustrating a structure of a liquid crystal display of Examples 3 and 4 according to an embodiment of the present application.

FIG. 11 is a diagram schematically illustrating a structure of a liquid crystal display of Comparative Example 3 according to an embodiment of the present application.

FIGS. 12A, 12B and 12C are diagrams illustrating an optical characteristic of a liquid crystal display of Examples 3 and 4 according to an embodiment of the present application, and Comparative Example 3, repectively.

EXPLANATION OF REFERENCE NUMERALS AND SYMBOLS

10: Upper polarizer
20: Lower polarizer

30: Liquid crystal panel
40: Adhesive
50: quarter wave plate
60: half wave plate

DETAILED DESCRIPTION

Hereinafter, preferred embodiments of the present application will be described. However, the embodiments of the present application may be modified into various other forms, and the scope of the present application is not limited to the embodiments described below. Further, the embodiments of the present application are provided for more completely describing the present application to those having average knowledge in the art.

In this specification, a case where a part "comprises" an element will be understood to imply the inclusion of stated elements but not the exclusion of any other elements unless explicitly described to the contrary.

The structure of the liquid crystal display in the related art is schematically illustrated in FIG. 1 below. In the liquid crystal display in the related art, an absorption axis of any one polarizer of an upper polarizer and a lower polarizer is set to 0 degree and the absorption axis of the other one polarizer is set to 90 degrees and the absorption axes of the upper polarizer and the lower polarizer are orthogonal to each other. However, when the absorption axis of the polarizer is 90 degrees, a horizontal length of the polarizer is limited by a width of a roll from which the polarizer is manufactured the polarizer, and as a result, there is a limiting factor for enlarging a product size. A maximum width of the roll from which a current polarizer is manufactured is approximately 2600 nm, which means that a maximum size of a 21:9 standard TV is approximately a 110 inch level.

In order to improve the limitation of the size of such a polarizer, a method for transversely stretching a polyvinyl alcohol (PVA) film to form the absorption axis of a polarizer roll in transverse direction is proposed. However, even in such a case, unevenness due to lowering of the uniformity of the transverse stretching may occur and the degree of polarization due to the lowering of a stretching ratio may be lowered.

Thus, in the present application, the absorption axes of the upper polarizer and the lower polarizer of the liquid crystal display are all set to 0 degree, thereby resolving the size limitation of the polarizer according to the width of the polarizer raw material.

According to an embodiment of the present application, there is provided a liquid crystal display comprising: an upper polarizer; a lower polarizer; and a liquid crystal panel provided between the upper polarizer and the lower polarizer, the upper polarizer and the lower polarizer are provided such that the absorption axes thereof are parallel to each other, a wave plate is provided between the upper polarizer and the liquid crystal panel which rotates linear polarized light at 85 to 95 degrees, and the liquid crystal panel is a horizontally aligned mode liquid crystal panel.

In an embodiment of the present application, it is more preferable to provide the wave plate between the upper polarizer and the liquid crystal panel than a case where the wave plate is provided between the lower polarizer and the liquid crystal panel.

In an embodiment of the present application, in regard to the upper polarizer and the lower polarizer, the polarizer which is attached to a TFT glass surface, which is a lower portion of the liquid crystal panel, is referred to as the lower polarizer, and the polarizer attached to an upper portion of the liquid crystal panel which is an opposite side is referred to as the upper polarizer.

Light emitted from a backlight unit (BLU) and incident on the lower polarizer has a black luminance rising element at a front due to scattering inside a cell in a lower panel. In this case, scattered light may be absorbed by the polarizer of an upper plate as long as there is no retardation of the lower plate, so that as compared with the case where the wave plate is provided between the lower polarizer and the liquid crystal panel, in the case where the wave plate is provided between the upper polarizer and the liquid crystal panel, the black luminance is reduced due to side light scattering, and as a result, front CR is raised.

In an embodiment of the present application, the upper polarizer and the lower polarizer may be provided such that the absorption axes thereof are parallel to each other. For example, the absorption axes of the upper polarizer and the lower polarizer may all be zero degree.

In an embodiment of the present application, a wave plate for rotating the linearly polarized light at 85 to 95 degrees may be provided between the upper polarizer and the liquid crystal panel. For example, a wave plate for rotating the linearly polarized light at 90 degrees may be provided between the upper polarizer and the liquid crystal panel.

In an embodiment of the present application, the wave plate may comprise one or two half wave plates. In this case, the wave plate comprises one half wave plate and an angle formed by an optical axis of the one half wave plate and the absorption axis of the upper polarizer is preferably 40 to 50 degrees or 130 or 140 degrees. When the angle is out of the above range, 90-degree linearly polarized light conversion may not be made (e.g., 0 degree→90 degrees), the optical axis is not orthogonal to the absorption axis of the upper polarizer and light leakage occurs in black and C/R drop occurs. Ideal optical axis angles are 45 degrees and 135 degrees, and the reason for setting such a range is to consider manufacturing tolerances of general optical films.

Further, the wave plate comprises two half wave plates, and an angle formed between the optical axis of one of the two half wave plates and the absorption axis of the upper polarizer is in the range of 20 degrees to 25 degrees and an angle formed between the optical axis of the other half wave plate and the absorption axis of the upper polarizer is preferably in the range of 65 degrees to 70 degrees. When the angle is out of the above range, the 90-degree linearly polarized light conversion may not be made (e.g., 0 degree→90 degrees), the optical axis is not orthogonal to the absorption axis of the upper polarizer and the light leakage occurs in black and the C/R drop occurs. The ideal optical axis angles are 22.5 degrees and 67.5 degrees, and the reason for setting such a range is to consider the manufacturing tolerances of the general optical films.

The half wave plate may be made of materials known in the art and is not particularly limited. For example, polyolefin (polyethylene, polypropylene, polynorbornene and the like), amorphous polyolefin, polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, polymethyl methacrylate, polymethacrylate, polyacrylate, polystyrene, cellulose-based polymer (such as triacetyl cellulose), PVA, epoxy resin, phenol resin, norbornene resin, polyester resin, acrylic resin, vinyl chloride resin, vinylidene chloride resin, etc. may be singly used or two or more thereof may be mixedly used, but the present application is not limited thereto.

The half wave plate may be obtained by forming the resin compositions and performing uniaxial or biaxial stretching. Further, as the half wave plate, an alignment film in which a liquid crystalline polymer or a liquid crystalline monomer is aligned may be used.

The half wave plate is a retarder that implements a phase difference as λ/2 so that a relative phase difference between an e-ray and an o-ray becomes π. The phase difference may be represented as Δn and the half wave plate may be manufactured by adjusting a thickness according to Δn of a material.

Further, the wave plate may comprise two or four quarter wave plates. In this case, the wave plate comprises two quarter wave plate and angles formed by the optical axes of the two quarter wave plates and the absorption axis of the upper polarizer are preferably in the range of 40 to 50 degrees or 130 or 140 degrees. When the angle is out of the above range, the 90-degree linearly polarized light conversion may not be made (e.g., 0 degree→90 degrees), the optical axis is not orthogonal to the absorption axis of the upper polarizer and the light leakage occurs in black and the C/R drop occurs. The ideal optical axis angles are 45 degrees and 135 degrees, and the reason for setting such a range is to consider manufacturing tolerances of general optical films.

Further, the wave plate comprises four quarter wave plates, and angles formed between the optical axes of any two quarter wave plates among the four quarter wave plates and the absorption axis of the upper polarizer are in the range of 20 degrees to 25 degrees and angles formed between the optical axes of the other two quarter wave plates and the absorption axis of the upper polarizer are preferably in the range of 65 degrees to 70 degrees. When the angle is out of the above range, the 90-degree linearly polarized light conversion may not be made (e.g., 0 degree→90 degrees), the optical axis is not orthogonal to the absorption axis of the upper polarizer and the light leakage occurs in black and the C/R drop occurs. The ideal optical axis angles are 22.5 degrees and 67.5 degrees, and the reason for setting such a range is to consider the manufacturing tolerances of the general optical films.

The quarter wave plate may be made of materials known in the art and is not particularly limited. For example, the quarter wave plate may be formed by a uniaxially stretched cycloolefin film, a uniaxially stretched polyethylene terephthalate film, a uniaxially stretched polycarbonate film, or a liquid crystal film.

The quarter wave plate may be obtained by forming the resin compositions and performing uniaxial or biaxial stretching. Further, as the quarter wave plate, an alignment film in which a liquid crystalline polymer or a liquid crystalline monomer is aligned may be used.

The quarter wave plate is a film made so that the relative phase difference between the e-ray and the o-ray becomes π/2. Linear polarization is made to circular polarization or the circular polarization is made to the linear polarization.

In an embodiment of the present application, the quarter wave plate may additionally comprise a viewing angle compensation film on the upper and lower portions of the wave plate independently. More specifically, the viewing angle compensation film may be additionally provided between the wave plate and the liquid crystal panel and the viewing angle compensation film may be additionally provided between the wave plate and the upper polarizer or the lower polarizer.

The viewing angle compensation film may be made of materials known in the art and is not particularly limited.

The liquid crystal panel and the upper polarizer or the lower polarizer, the wave plate and the upper polarizer or the lower polarizer, the wave plate and the liquid crystal panel, the quarter wave plate, and the like may be bonded by using an aqueous adhesive or a UV curable adhesive or a PSA gluing agent.

In an embodiment of the present application, the upper polarizer and the lower polarizer may be polyvinyl alcohol polarizers comprising at least one of iodine and dichroic dyes.

As an example of the method for preparing the polyvinyl alcohol polarizer, a method comprising a step of preparing a polyvinyl alcohol polarizer comprising iodine and/or a dichroic dye, and a step of laminating a protective film on one surface of the polarizer may be used. For example, the method is not limited thereto, but the step of preparing the polyvinyl alcohol polarizer may comprise a dying step of dying the polyvinyl alcohol polymer film with the iodine and/or the dichroic dye, a cross-linking step of cross-linking the polyvinyl alcohol film and the dye, and a stretching step of stretching the polyvinyl alcohol film.

A film for protecting the polarizer refers to a transparent film attached on one surface of the polarizer and may adopt a film which is excellent in mechanical strength, thermal stability, moisture shielding property, isotropy, and the like. For example, an acetate based film such as triacetyl cellulose (TAC), polyester based, polyether sulfone based, polycarbonate based, polyamide based, polyimide based, polyolefin based, cycloolefin based, polyurethane based, and acryl based resin films may be used, but the present application is not limited thereto.

In addition, the protective film may be an isotropic film, may be an anisotropic film having an optical compensation function such as the phase difference, or may be composed of one sheet or may be composed of two or more sheets bonded together. Further, the protective film may be an unstretched, uniaxially or biaxially stretched film, and the thickness of the protective film is generally 1 to 500 μm and preferably 1 to 300 μm.

Meanwhile, in the step of laminating the protective film on one surface of the polyvinyl alcohol polarizer, the protective film is bonded to the polarizer and the protective film may be bonded to the polarizer by using the adhesive. In this case, the bonding may be performed through a joining method of the film well known to the art and for example, the bonding may be performed by using adhesives well known to the art, which comprise the aqueous adhesive such as the polyvinyl alcohol adhesive, a thermosetting adhesive such as the urethane based adhesive, etc., a photo-cation curable adhesive such as the epoxy based adhesive, etc., and optical radical curable adhesives such as the acryl based adhesive, etc.

The liquid crystal display according to an embodiment of the present application may additionally comprise a backlight unit. The backlight unit serves to supply light to the liquid crystal panel and a light source of the backlight unit may adopt any one of a cold cathode fluorescent lamp (CCFL), an external electrode fluorescent lamp (EEFL), a fluorescent lamp of a hot cold fluorescent lamp (HCFL), or a light emitting diode (LED).

In an embodiment of the present application, the liquid crystal panel may be an In Plane Switching (IPS) mode liquid crystal panel or a Plane to Line Switching (PLS) mode liquid crystal panel, but is not limited only thereto.

Further, the types of the other constituent elements constituting the liquid crystal display, for example, upper and lower substrates (e.g., color filter substrate or array substrate) are not also particularly limited, and the configurations known in this field may be adopted without the limitation.

The structure of the liquid crystal display according to an embodiment of the present application is schematically illustrated in FIGS. 2, 5, 8, and 9 below. More specifically, FIG. 2 below illustrates a liquid crystal display comprising two quarter wave plates as the wave plate and FIG. 5 below illustrates a liquid crystal display comprising four quarter wave plates as the wave plate. In addition, FIG. 8 below illustrates a liquid crystal display comprising one half wave plate as the wave plate and FIG. 9 below illustrates a liquid crystal display comprising two half wave plates as the wave plate.

Hereinafter, the present invention will be described in more detail with reference to examples. The following Examples are provided to aid understanding of the present invention and are not thus intended to limit the present invention.

EXAMPLES

Example 1

A mass-produced polarizer (made by LG Chemical Co., Ltd.) which is laminated in a structure of TAC/PVA/TAC was cut so that the absorption axis becomes 0 degree and used as a base substrate and two quarter wave plates (144 nm, made by Fuji Film) having an optical axis of 22.5 degrees are joined to the cut polarizer by using a gluing agent. Thereafter, the same quarter wave plate fabric was cut to have an optical axis of 67.5 degrees and then, two additional sheets were attached to the lower portion of a half wave plate which was previously attached to the bonding product by using the gluing agent. Thereafter, a polarization plate was fabricated by applying the gluing agent to the lower portion of the half wave plate having the optical axis of 67.5 degrees.

The polarization plate was attached to the upper portion of the liquid crystal panel and a general polarizer used as the base substrate was attached to the lower portion of the liquid crystal panel with an absorption axis of 0 degree.

The structure of Example 1 is schematically illustrated in FIG. 5.

Comparative Example 1

A polarization plate comprising the half wave plate was fabricated by the same method as Example 1, the fabricated polarization plate was attached to the lower portion of the liquid crystal panel with the absorption axis of 0 degree, and the general polarizer used as the base substrate was attached to the upper portion of the liquid crystal panel with the absorption axis of 0 degree.

The structure of Comparative Example 1 is schematically illustrated in FIG. 6 below.

Example 2

A general polarizer which is laminated in a structure of TAC/PVA/TAC was cut so that the absorption axis becomes 0 degree and used as the base substrate and two quarter wave plates (144 nm, made by Fuji Film) having the optical axis of 45 degrees are joined to the cut polarizer by using the gluing agent. Thereafter, the polarization plate was fabricated by applying the gluing agent to the lower portion of the half wave plate which was previously attached.

The polarization plate was attached to the upper portion of the liquid crystal panel and a general polarizer used as the base substrate was attached to the lower portion of the liquid crystal panel with an absorption axis of 0 degree.

The structure of Example 2 is schematically illustrated in FIG. 2 below.

Comparative Example 2

The polarization plate comprising the half wave plate was fabricated by the same method as Example 2, the fabricated polarization plate was attached to the lower portion of the liquid crystal panel with the absorption axis of 0 degree, and the general polarizer used as the base substrate was attached to the upper portion of the liquid crystal panel with the absorption axis of 0 degree.

The structure of Comparative Example 2 is schematically illustrated in FIG. 3 below.

Experimental Example 1

Optical characteristics of the polarization plate attached to the panel according to Examples 1 and 2 and Comparative Examples 1 and 2 were measured and shown in Tables 1, 4, and 7 below. FIGS. 4A and 4B illustrate results depending on Example 2 and Comparative Example 2, and FIGS. 7A and 7B illustrate results depending on Example 1 and Comparative Example 1.

In order to avoid a deviation factor of the optical characteristics according to a position in the panel, the optical characteristics were measured and compared at the same position of the same panel.

A panel used for evaluation is a 12.3" product of IPS mode and black luminance and white luminance were measured b using EZ contrast 160R made by Eldim as an optical measurer and relatively compared with the comparative example.

TABLE 1

|  | Black luminance | White luminance | C/R |
| --- | --- | --- | --- |
| Comparative Example 1 | 100% | 100% | 100% |
| Example 1 | −31% | +7.0% | +54% |
| Comparative Example 2 | 100% | 100% | 100% |
| Example 2 | −37% | −1.0% | +59% |

Here, C/R represents a contrast ratio representing a white luminance/black luminance value, and the data shows a relative ratio of luminance values in black and white at the front having an azimuth angle of 0 degree and a polar angle of 0 degree. The C/R value of Example 1 of +54% means that the C/R value, as compared with Comparative Example 1 is increased by 54%, and +59% of Example 2 means that the C/R value, as compared with Comparative Example 2 is increased by 59%.

It may be apparently known that in a case where the polarization plate comprising all half wave plates is positioned at the upper portion of the panel, the C/R increases by approximately 50% or more as compared with a case where the polarization plate is positioned at the lower portion of the panel.

Example 3

Example 3 is configured by setting the absorption axis of the upper polarizer to 0 degree and sequentially laminating two quarter wave plates on the lower portion, which have the optical axis of 67.5 degrees, and sequentially laminating two quarter wave plates on the lower portion, which have the optical axis of 22.5 degrees. In this case, R(450)/R(550) of the applied quarter wave plate is 0.86, R(450) means retardation at 450 nm, and R (550) means retardation at 550 nm. The Example is configured by locating the structure of the polarization plate at the upper portion of the liquid crystal layer and setting the absorption axis of the polarizer to 0 degree at the lower portion.

The structure of Example 3 is schematically illustrated in FIG. 10.

Example 4

Example 4 is configured by setting the absorption axis of the upper polarizer to 0 degree and sequentially laminating two quarter wave plates on the lower portion, which have the optical axis of 22.5 degrees, and sequentially laminating two quarter wave plates on the lower portion, which have the optical axis of 67.5 degrees. In this case, R(450)/R(550) of the applied quarter wave plate is 0.86, R(450) means retardation at 450 nm, and R (550) means retardation at 550 nm. Example 4 is configured by locating the structure of the polarization plate at the upper portion of the liquid crystal layer and setting the absorption axis of the polarizer to 0 degree at the lower portion.

The structure of Example 4 is schematically illustrated in FIG. 10.

Comparative Example 3

The absorption axis of the upper polarizer is set to 0, and one half wave plate having an optical axis of 79 degrees, one half wave plate having an optical axis of 45 degrees, and one half wave plate having an optical axis of 11 degrees are sequentially laminated at the lower portion. In this case, R(450)/R(550) of the applied half wave plate is 0.86, R(450) means retardation at 450 nm, and R (550) means retardation at 550 nm. Comparative Example 3 is configured by locating the structure of the polarization plate at the upper portion of the liquid crystal layer and setting the absorption axis of the polarizer to 0 degree at the lower portion.

The structure of Comparative Example 3 is schematically illustrated in FIG. 11 below.

Experimental Example 2

The structures configured according to Examples 3 and 4 and Comparative Example 3 are shown in Table 2 and FIGS. 12A, 12B and 12C, by simulating the optical characteristic in a black state by using a Techwiz 1D program.

TABLE 2

| cd/m² | Front black luminance | Viewing angle black max |
|---|---|---|
| Example 3 | 0.440 | 226.6 |
| Example 4 | 0.440 | 226.6 |
| Comparative Example 3 | 0.445 | 357.8 |

Here, the front black luminance means luminance at the azimuth angle of 0 degree and the polar angle of 0 degree, and the viewing angle black max means a value of a portion with highest black luminance at a front azimuth angle and a front azimuth angle.

Like the above result, when the wave plate is provided between the upper polarizer and the liquid crystal panel, which rotates the linearly polarized light at 85 to 95 degrees, the wave plate comprises four quarter wave plates, and angles formed between the optical axes of any two quarter wave plates among the four quarter wave plates and the absorption axis of the upper polarizer is in the range of 20 degrees to 25 degrees and angles formed between the optical axes of the other two quarter wave plates and the absorption axis of the upper polarizer is in the range of 65 degrees to 70 degrees, the front contrast ratio (CR) may be more effectively increased by effectively rotating the polarization as compared with a case of configuring a polarization rotation layer in a range which is out of the angle.

The invention claimed is:

1. A liquid crystal display comprising:
an upper polarizer;
a lower polarizer; and
a liquid crystal panel provided between the upper polarizer and the lower polarizer, wherein an upper surface of the lower polarizer is directly bonded to a lower surface of the liquid crystal panel,
wherein the upper polarizer and the lower polarizer are provided such that absorption axes thereof are parallel to each other,
a wave plate is provided between the upper polarizer and the liquid crystal panel, which rotates linearly polarized light at 85 to 95 degrees,
wherein the wave plate comprises four quarter wave plates, angles formed between the optical axis of any two quarter wave plates among the four quarter wave plates and the absorption axis of the upper polarizer are in the range of 20 degrees to 25 degrees and angles formed between the optical axes of the other two quarter wave plates and the absorption axis of the upper polarizer are in the range of 65 degrees to 70 degrees,
a viewing angle compensation film between the wave plate and the liquid crystal panel, and
the liquid crystal panel is a horizontally aligned mode liquid crystal panel.

2. The liquid crystal display of claim 1, wherein the upper polarizer and the lower polarizer are polyvinyl alcohol polarizers comprising at least one of iodine and dichroic dyes.

3. The liquid crystal display of claim 1, wherein the liquid crystal panel is an in plane switching (IPS) mode liquid crystal panel or a plane to line switching (PLS) mode liquid crystal panel.

* * * * *